(12) United States Patent
Palenius

(10) Patent No.: US 6,512,750 B1
(45) Date of Patent: Jan. 28, 2003

(54) POWER SETTING IN CDMA SYSTEMS EMPLOYING DISCONTINUOUS TRANSMISSION

(75) Inventor: Torgny Palenius, Löddeköpinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/292,998

(22) Filed: Apr. 16, 1999

(51) Int. Cl.[7] .............................. H04B 7/00; H04Q 7/20
(52) U.S. Cl. ...................... 370/318; 370/320; 370/335; 370/441; 455/69; 455/522
(58) Field of Search ................................ 455/522, 67.1, 455/13.4, 69, 504, 506; 370/318, 320, 331, 332, 333, 335, 441

(56) References Cited

U.S. PATENT DOCUMENTS

| | | | |
|---|---|---|---|
| 4,744,083 A | | 5/1988 | O'Neill et al. |
| 4,930,140 A | | 5/1990 | Cripps et al. |
| 5,103,459 A | | 4/1992 | Gilhousen et al. |
| 5,166,951 A | | 11/1992 | Schilling |
| 5,239,557 A | * | 8/1993 | Dent ........................... 370/342 |
| 5,373,502 A | | 12/1994 | Turban |
| 5,533,014 A | | 7/1996 | Willars et al. |
| 5,815,798 A | * | 9/1998 | Bhagalia et al. ............ 370/311 |
| 5,883,899 A | * | 3/1999 | Dahlman et al. ........... 370/320 |
| 5,896,368 A | * | 4/1999 | Dahlman et al. ........... 370/335 |
| 5,910,944 A | * | 6/1999 | Callicotte et al. .......... 340/7.38 |
| 6,085,107 A | * | 7/2000 | Persson et al. ............. 370/318 |
| 6,122,270 A | * | 9/2000 | Whinnett et al. ........... 370/342 |
| 6,347,081 B1 | * | 2/2002 | Bruhn ......................... 370/318 |
| 6,351,651 B1 | * | 2/2002 | Hamabe et al. ............. 455/522 |

FOREIGN PATENT DOCUMENTS

| | | |
|---|---|---|
| EP | 0097579 | 1/1984 |
| EP | 0652650 | 5/1995 |
| EP | 0 893 890 | 1/1999 |
| WO | WO94/29980 | 12/1994 |
| WO | WO94/29981 | 12/1994 |
| WO | WO95/10145 | 4/1995 |
| WO | WO96/06512 | 2/1996 |
| WO | WO97/40592 | 10/1997 |
| WO | WO97/40593 | 10/1997 |
| WO | WO99/43105 | 8/1999 |

OTHER PUBLICATIONS

Håkan Persson and Per Willars, "Techniques to Provide Seamless Handover for a DS–CDMA System", Jun. 18, 1993, Race Workshop.

Håkan Eriksson et al, "Multiple Access Options for Cellular Based Personal Communications", May 18–20, 1993, 43rd IEEE Vehicular Technology Conference, Secaucus, NJ USA.

* cited by examiner

Primary Examiner—William Trost
Assistant Examiner—Simon Nguyen
(74) Attorney, Agent, or Firm—Burns, Doane, Swecker & Mathis, L.L.P.

(57) ABSTRACT

Introduction of slotted mode transmission in one link of a CDMA communication connection is supported by considering power control associated with the other link. According to one exemplary embodiment, power control is implemented by increasing the power by a fading margin in the other link during the idle portion created by slotted mode transmission in the first link. According to another exemplary embodiment both links enter slotted mode substantially simultaneously, such that their idle periods overlap and power control is not needed during the idle transmit time.

24 Claims, 5 Drawing Sheets

POWER SETTING IN CDMA SYSTEMS EMPLOYING DISCONTINUOUS TRANSMISSION

BACKGROUND

The present invention relates to the use of Code Division Multiple Access (CDMA) communications techniques in cellular radio telephone communication systems, and more particularly, to methods and systems related to power control in systems using discontinuous Direct Sequence-Code Division Multiple Access (DS-CDMA) transmissions.

DS-CDMA is one type of spread spectrum communication. Spread spectrum communications have been in existence since the days of World War II. Early applications were predominantly military oriented. However, today there has been an increasing interest in using spread spectrum systems in commercial applications. Some examples include digital cellular radio, land mobile radio, satellite systems and indoor and outdoor personal communication networks referred to herein collectively as cellular systems.

Currently, channel access in cellular systems is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which pass substantial signal energy only within the specified frequency band. Thus, with each channel being assigned a different frequency band, system capacity is limited by the number of available frequency bands as well as by limitations imposed by frequency reuse.

In TDMA systems which do not employ frequency hopping, a channel consists of a time slot in a periodic train of time intervals over the same frequency band. Each period of time slots is called a frame. A given signal's energy is confined to one of these time slots. Adjacent channel interference is limited by the use of a time gate or other synchronization element that passes signal energy received at the proper time. Thus, the problem of interference from different relative signal strength levels is reduced.

With FDMA or TDMA systems (or hybrid FDMA/TDMA systems), one goal is to insure that two potentially interfering signals do not occupy the same frequency at the same time. In contrast, Code Division Multiple Access (CDMA) is an access technique which uses spread spectrum modulation to allow signals to overlap in both time and frequency. There are a number of potential advantages associated with CDMA communication techniques. The capacity limits of CDMA-based cellular systems are projected to be higher than that of existing analog technology as a result of the properties of wideband CDMA systems, such as improved interference diversity and voice activity gating.

In a direct sequence (DS) CDMA system the symbol stream to be transmitted (i.e., a symbol stream which has undergone channel encoding etc.) is impressed upon a much higher rate data stream known as a signature sequence. Typically, the signature sequence data (commonly referred to as "chips") are binary or quaternary, providing a chip stream which is generated at a rate which is commonly referred to as the "chip rate". One way to generate this signature sequence is with a pseudo-noise (PN) process that appears random, but can be replicated by an authorized receiver. The symbol stream and the signature sequence stream can be combined by multiplying the two streams together. This combination of the signature sequence stream with the symbol stream is called spreading the symbol stream signal. Each symbol stream or channel is typically allocated a unique spreading code. The ratio between the chip rate and the symbol rate is called the spreading ratio.

A plurality of spread signals modulate a radio frequency carrier, for example by quadrature phase shift keying (QPSK), and are jointly received as a composite signal at a receiver. Each of the spread signals overlaps all of the other spread signals, as well as noise-related signals, in both frequency and time. If the receiver is authorized, then the composite signal is correlated with one of the unique codes, and the corresponding signal can be isolated and decoded.

For future cellular systems, the use of hierarchical cell structures will prove valuable in even further increasing system capacity. In hierarchical cell structures, smaller cells or micro cells exist within a larger cell or macro cell. For instance, micro cell base stations can be placed at a lamp post level along urban streets to handle the increased traffic level in congested areas. Each micro cell might cover several blocks of a street or a tunnel, for instance while a macro cell might cover a 3–5 Km radius. Even in CDMA systems, it is likely that the different types of cells (macro and micro) will operate at different frequencies so as to increase the capacity of the overall system. See, H. Eriksson et al., "Multiple Access Options For Cellular Based Personal Comm.," *Proc. 43rd Vehic. Tech. Soc. Conf.*, Secaucus, 1993. Reliable handover procedures must be supported between the different cell types, and thus between different frequencies so that mobile stations which move between cells will have continued support of their connections.

There are several conventional techniques for determining which new code, frequency and cell should be selected among plural handover candidates. For example, the mobile station can aid in the determination of the best handover candidate (and associated new base station) to which communications are to be transferred. This process, typically referred to as mobile assisted handover (MAHO), involves the mobile station periodically (or on demand) making measurements on each of several candidate frequencies to help determine a best handover candidate based on some predetermined selection criteria (e.g., strongest received RSSI, best BER, etc.). In TDMA systems, for example, the mobile station can be directed to scan a list of candidate frequencies during idle time slot(s), so that the system will determine a reliable handover candidate if the signal quality on its current link degrades beneath a predetermined quality threshold.

In conventional CDMA systems, however, the mobile station is continuously occupied with receiving information from the network. In fact, CDMA mobile stations normally continuously receive and transmit in both uplink and downlink directions. Unlike TDMA, there are no idle time slots available to switch to other carrier frequencies, which creates a problem when considering how to determine whether handover to a given base station on a given frequency is appropriate at a particular instant. Since the mobile station cannot provide any inter-frequency measurements to a handover evaluation algorithm operating either in the network or the mobile station, the handover decision will be made without full knowledge of the interference situation experienced by the mobile station, and therefore can be unreliable.

One possible solution to this problem is the provision of an additional receiver in the mobile unit which can be used to take measurements on candidate frequencies. Another possibility is to use a wideband receiver which is capable of simultaneously receiving and demodulating several carrier frequencies. However, these solutions add complexity and expense to the mobile unit.

Another solution is presented in U.S. Pat. No. 5,533,014 to Willars et al.,the disclosure of which is expressly incorporated here by reference, wherein this problem is addressed by introducing discontinuous transmission into CDMA communications techniques. In this patent, for example, a compressed transmission mode is provided using a lower spreading ratio (i.e., by decreasing the number of chips per symbol) such that with a fixed chip rate the spread information only fills a part of a frame. This leaves part of each frame, referred to therein as an idle part, during which the receiver can perform other functions, such as the evaluation of candidate cells at other frequencies for purposes of handover.

Various other mechanisms available for creating an idle part within a CDMA frame (which technique is sometimes referred to as "slotted mode" operation) are also known, e.g., U.S. Pat. No. 5,883,899 entitled "Code Rate Reduced Compressed Mode DS-CDMA" to E. Dahlman and U.S. patent application Ser. No. 08/636,648, entitled "Multi-Code Compressed Mode DS-CDMA Systems and Methods", to E. Dahlman and filed on Apr. 23, 1996, the disclosures of which are also incorporated here by reference. Slotted mode operation is illustrated conceptually in FIG. 1. Therein, a plurality of downlink (DL) frame transmissions are depicted, each having a duration of 10 ms in this example. During frame #4, an idle portion is created by doubling the transmission rate during the beginning and end portion of the frame, as represented by the two higher bars 10 and 12. Corresponding frames are also illustrated for the uplink (UL).

The usage of a slotted mode technique to perform, for example, measurements on other channels raises a problem, however, in connection with power control. Power control techniques are implemented in radiocommunication systems to ensure reliable reception of a signal at each remote station, i.e., to provide that the ratio of the signal to the interference (SIR) should be above a prescribed threshold for each remote station.

To improve the SIR for a remote station which drops below this threshold, the energy of the signal is increased to appropriate levels. However, increasing the energy associated with one remote station increases the interference associated with other nearby remote stations. As such, the radio communication system must strike a balance between the requirements of all remote stations sharing the same common channel. A steady state condition is reached when the SIR requirements for all remote stations within a given radio communication system are satisfied. Generally speaking, the balanced steady state may be achieved by transmitting to each remote station using power levels which are neither too high nor too low. Transmitting messages at unnecessarily high levels raises interference experienced at each remote receiver, and limits the number of signals which may be successfully communicated on the common channel (e.g. reduces system capacity).

This technique for controlling transmit power in radiocommunication systems is commonly referred to as a fast power control loop. The initial SIR target is established based upon a desired quality of service (QoS) for a particular connection or service type. For non-orthogonal channels, the actual SIR values experienced by a particular remote station or base station can be expressed as:

$$SIR = \frac{\text{Mean power of received signal}}{\text{Sum of the mean powers of all interfering signals}} \quad (1)$$

The SIR is measured by the receiving party and is used for determining which power control command is sent to the transmitting party.

A slow power control loop can then be used to adjust the SIR target value on an ongoing basis. For example, the remote station can measure the quality of the signals received from the remote station using, for example, known bit error rate (BER) or frame error rate (FER) techniques. Based upon the received signal quality, which may fluctuate during the course of a connection between the base station and a remote station, the slow power control loop can adjust the SIR target that the fast power control loop uses to adjust the base station's transmitted power. Similar techniques can be used to control uplink transmit power.

Applicant has recognized, however, that when employing slotted mode transmission in the downlink to permit remote stations to perform measurements, power control commands are not being transmitted to inform the remote stations of how to adjust their transmit powers for the uplink, e.g., during the time represented by the striped portion of frame #4 of the uplink in FIG. 1. This increases the likelihood of erroneous reception of information by the base station on the uplink due to improper transmit powers being used.

The impact of slotted mode transmissions on system capacity and performance has not been thoroughly investigated. It has previously been assumed that the slow power control loop will adequately handle power control during slotted mode transmissions, as well as normal mode transmissions.

However, using the slow power control loop to handle slotted mode transmission has the potential to cause another difficulty. Specifically, if slotted mode transmissions are made frequently, the BER (or FER) for that connection will increase. This, in turn, will cause the slow power control loop to adjust the SIR target, thereby increasing the transmit power in the uplink by an amount A as shown in FIG. 2. Therein, all of the frames are transmitted at a higher power than might otherwise be necessary absent the impact of slotted mode transmissions. However, in this situation where slotted mode transmissions are made rather frequently, using the slow power control loop to handle slotted mode transmissions suffers from the drawback that unnecessarily high power levels are used to transmit certain frames, e.g., at least some of frames #1–3 and #5–7 in FIG. 2, thereby effectively reducing capacity within the system. Alternatively, if slotted mode transmissions are made less frequently, the slow power control loop may provide little or no power adjustments, which may result in degraded BER/FER at the uplink receiver.

Accordingly, it would be desirable to provide a CDMA system in which transmission and reception was discontinuous (i.e., which employs slotted mode transmissions) but which avoids the aforementioned power control problems.

SUMMARY

These and other problems, drawbacks and limitations of conventional CDMA techniques are overcome according to the present invention, wherein, according to a first exemplary embodiment, when entering slotted mode the transmit power in the uplink is increased based on an estimated fading margin. This improves performance during the idle period in the downlink when no power control commands can be transmitted to the remote stations. At the end of the idle period, the power control loop can then return the remote stations to optimal transmit power levels.

According to a second exemplary embodiment of the present invention, when entering slotted mode in one link, e.g., the downlink, slotted mode can also be entered in the other link, e.g., the uplink. In this way, transmissions are not performed on the uplink without power control information during the idle period on the downlink.

BRIEF DESCRIPTION OF THE DRAWINGS

The foregoing, and other, features, objects and advantages of the present invention will become apparent from the detailed description set forth below when read in conjunction with the drawings, in which.

DETAILED DESCRIPTION

In the following description, for purposes of explanation and not limitation, specific details are set forth, such as particular circuits, circuit components, techniques, etc. in order to provide a thorough understanding of the invention. For example, various details are provided relating to exemplary modulation and transmitting techniques. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 3:
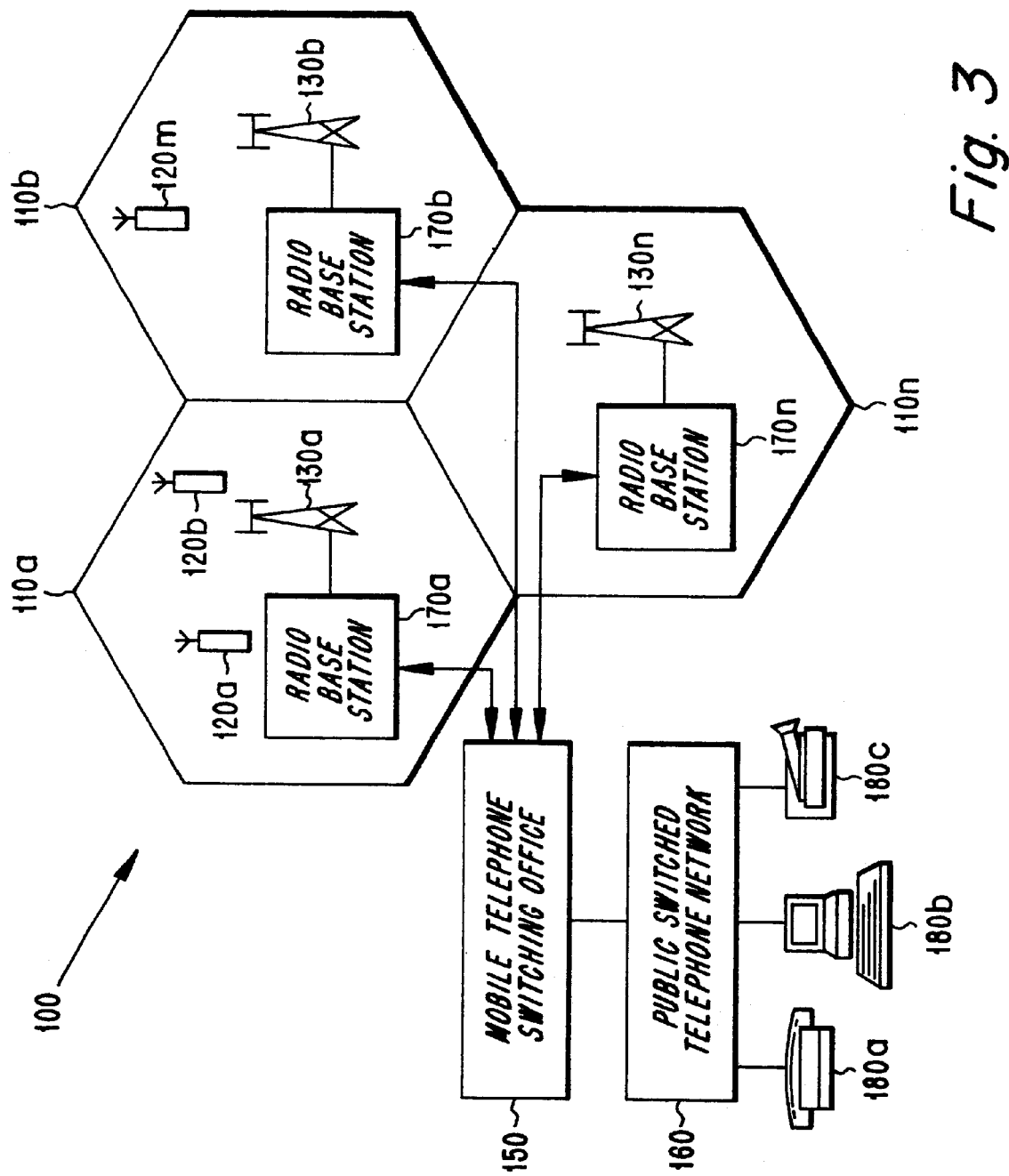
FIG. 3 illustrates an exemplary radiocommunication system in which the present invention can be implemented.

An exemplary cellular radio communication system 100 is illustrated in FIG. 3. As shown in FIG. 3, a geographic region served by the system is subdivided into a number, n, of smaller regions of radio coverage known as cells 110a–n, each cell having associated with it a respective radio base station 170a–n. Each radio base station 170a–n has associated with it a plurality of transmit and receive radio antennas 130a–n. Note that the use of hexagonal-shaped cells 110a–n is employed as a graphically convenient way of illustrating areas of radio coverage associated with a particular base station 170a–n. In actuality, cells 110a–n may be irregularly shaped, overlapping, and not necessarily contiguous. Each cell 110a–n may be further subdivided into sectors according to known methods. Distributed within cells 110a–n are a plurality, m, of mobile stations 120a–m. In practical systems the number, m, of mobile stations is much greater than the number, n, of cells. Base stations 170a–n comprise inter alia a plurality of base station transmitters and base station receivers (not shown) which provide two-way radio communication with mobile stations 120a–m located within their respective calls. As illustrated in FIG. 3, base stations 170a–n are coupled to the mobile telephone switching office (MTSO) 150 which provides inter alia a connection to the public switched telephone network (PSTN) 160 and henceforth to communication devices 180a–c. The cellular concept is known to those skilled in the art and, therefore, is not further described here.

According to the present invention radio communications between the base stations and the mobile stations are effected using direct sequence code division multiple access (DS-CDMA). In the following, the term "downlink", or "forward channel," refers to the radio transmission of information bearing signals from base stations 170a–n to mobile stations 120a–m. Similarly, the term "uplink", or "reverse channel," refers to the radio transmission of information bearing signals from mobile stations 120a–m to base stations 170a–n.

Today, radio communication systems are being used for an ever increasing array of applications. Traditional voice communications now coexist with the radio transmission of images, and a mix of other medium and high speed data applications. Such applications require a radio channel capable of conveying a variable mix of low, medium, and high bit rate information signals with a low transmission delay. To make efficient use of the radio spectrum, only that bandwidth which is needed for a particular application should be allocated. This is know as "bandwidth on demand." Accordingly, the following exemplary systems describe a multi-rate, DS-CDMA system in which the present invention can be applied, although those skilled in the art will appreciate that the present invention is equally applicable to any system that employs discontinuous transmissions.

Figure 4:
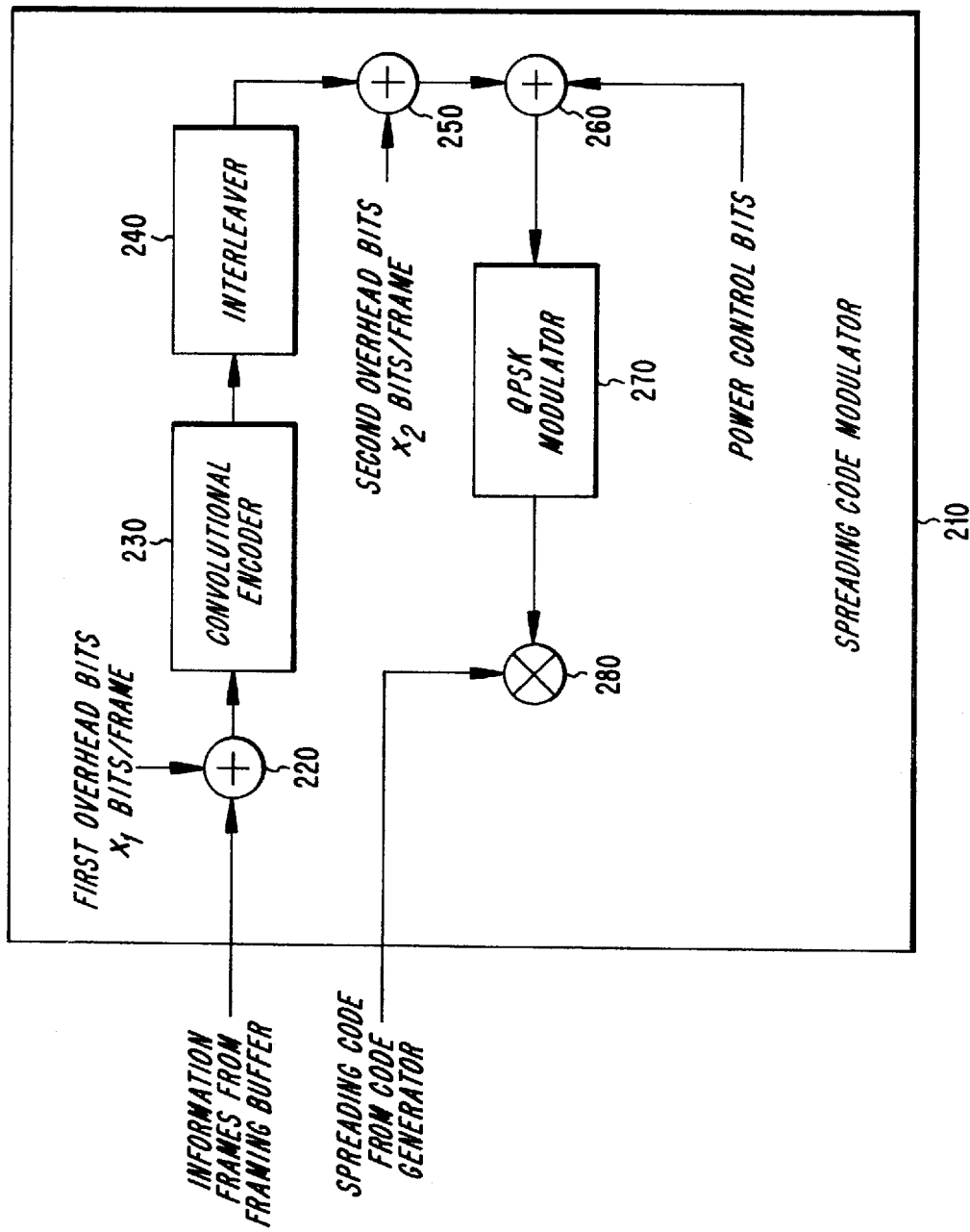
FIG. 4 is a schematic illustration of an exemplary spreading code modulator.

Arranging the information data bitstream to be transmitted on either the uplink or the downlink into a sequence of information frames allows the information data to be processed conveniently in spreading code modulator 210 as shown in FIG. 4. Prior to channel coding in convolutional encoder 230, the first overhead bits ($X_1$) comprising, for example, a portion of the cyclic redundancy check (CRC) bits are added to the information frame in time multiplexer 220. The frame comprising the information bits and the first overhead bits is coupled to convolutional encoder 230 and subjected to channel coding using, for example, a rate 1/3 convolutional encoder which adds redundancy to the frame. The encoded frame is then coupled to bit interleaver 240 where the encoded frame is subjected to block-wise bit interleaving. After interleaving, the second overhead bits $X_2$ are added to the encoded and interleaved frame in time multiplexer 250.

Downlink power control bits are also added to the encoded/interleaved frame in time multiplexer 260. The downlink power control bits instruct the mobile station to increase or decrease its transmitted power level. After the insertion of the power control bits, each frame is coupled to quadrature phase shift keying (QPSK) modulator 270. Those skilled in the art will appreciate that modulations other than QPSK modulation could also be used. QPSK modulator 270 maps the input bits, or symbols, into a sequence of complex symbols. The output of QPSK modulator is a complex sequence of symbols represented by, for example, Cartesian coordinates in the usual form I+jQ. Spreading of the output of the QPSK modulator is performed using a spreading code at multiplier 280. Other encoding, interleaving, and modulation combinations are possible.

In conventional CDMA systems, information is transmitted in a structure of frames with fixed length, e.g., 5–20 ms. Information to be transmitted within a frame is coded and spread together, e.g., as described above with respect to FIG. 4. This information is spread over each frame, resulting in continuous transmission during the whole frame at a constant power level.

Figure 5:
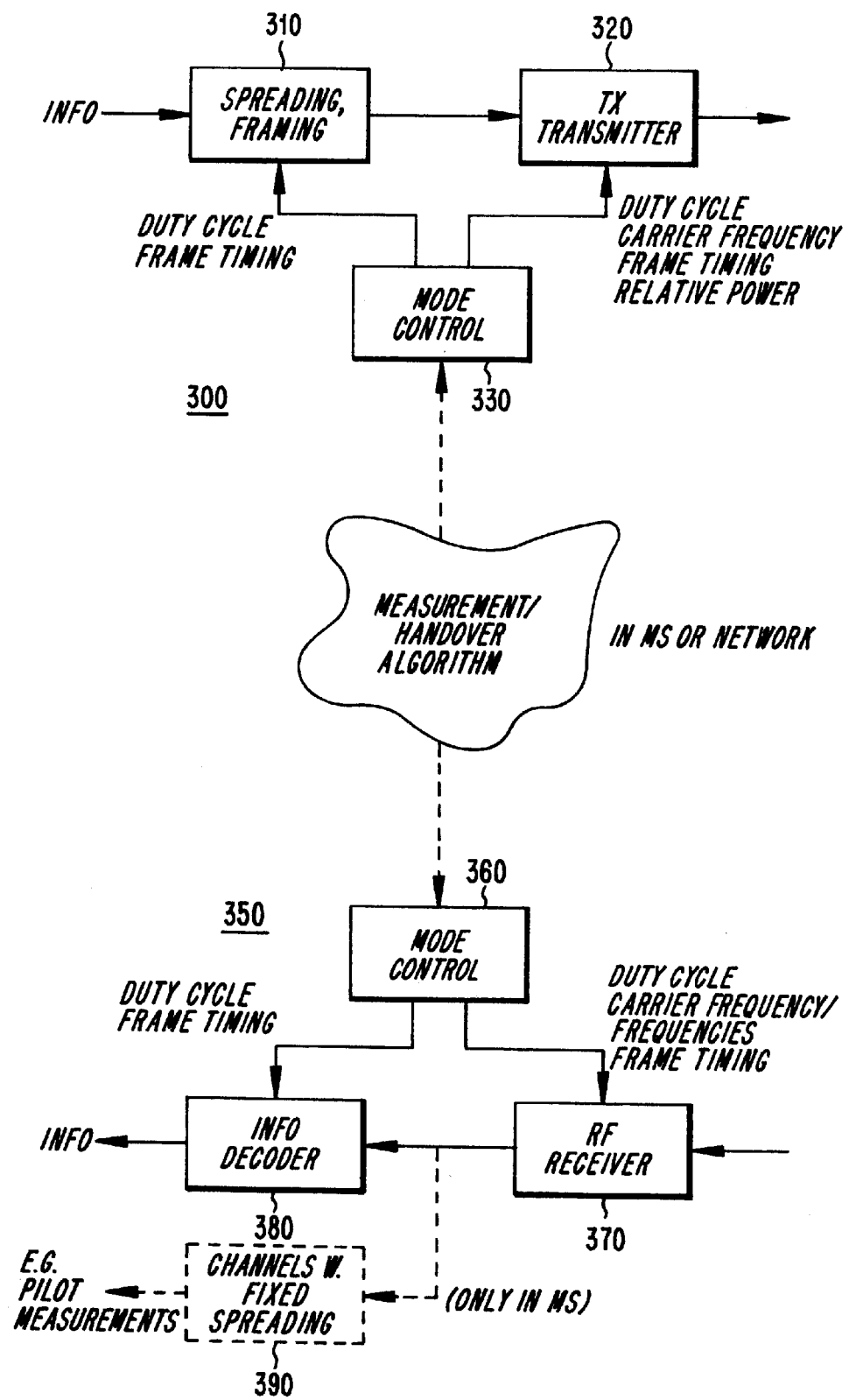
FIG. 5 depicts an exemplary variable rate CDMA system in which the present invention can be implemented.

However, the present invention employs discontinuous transmission in CDMA systems for, e.g., reliable handover candidate evaluation. FIG. 5 depicts an exemplary technique for providing slotted mode transmissions using a variable spreading code ratio, i.e., by varying the relationship between the number of chips per symbol. However, any of the techniques described in the above-incorporated patents and patent application may be used to create slotted mode transmissions which include an idle portion (or other techniques) can be used.

In FIG. 5, the same basic type of transmitter and receiver can be used in both the mobile station 170 and the base station 180. On the transmitter side 300, information data is input to a spreading and framing unit 310 wherein the information is slotted coded according to the DS-CDMA technique of the present invention. The spread and framed data is then transferred to a transmitter 320 and thereafter transmitted. The duty cycle and the frame timing are controlled by a mode controller 330 as follows.

The duty cycle is the ratio of the information part of a frame to the frame duration and is controlled on a frame by frame basis. For measurements on other frequencies, the duty cycle can remain relatively high (e.g., 0.8) since only a short period of time is needed for the measurement. For execution of macro diversity between two frequencies, the same information is sent to both. Therefore, the duty cycle should be approximately 0.5. The slotted mode transmission is used only intermittently and the normal mode (duty cycle=1) is used the remainder of the time because it is more efficient due to the larger spreading ratio.

The transmission power used during the information part of the frame is a function of the duty cycle. For example, $$P = \frac{P}{DutyCycle}$$

wherein $P_1$=power used for normal mode transmission. This increased power is needed to maintain transmission quality in the detector if the duty cycle, and thus the spreading ratio, is reduced. During the rest of the frame, i.e., the idle part, the power is turned off when slotted mode is used for measuring other carrier frequencies, for example.

The duty cycle of the relative power of the carrier frequency is also controlled by the mode controller 330 as described above. The mode controller 330 is controlled according to a measurement/handover algorithm. This algorithm can be implemented through software in either the mobile station MS or in the radio network controller RNC, or both, as a given situation makes advantageous.

On the receiver side 350, the mode controller 360 controls the duty cycle of the carrier frequency or frequencies and the frame timing of a radio frequency receiver 370. The radio frequency receiver 370 receives an incoming radio signal and demodulates it according to the duty cycle as controlled by the mode controller 360. The demodulated signal is input to an information decoder 380 the duty cycle and frame timing of which is controller by the mode controller 360. The mobile station 170 also includes a decoder 390 for channels having fixed spreading e.g., a pilot channel on which measurement of the signal strength of neighboring base stations 180 is carried out. The mode controller 36 controls the duty cycle, frame timing (which part of the frame is active), a carrier frequency (or frequencies in the receiver, if receiving from two different frequencies) and the relative power level.

The slotted mode can be used intermittently at a rate determined by the mobile station or network, however, it may be preferable for the network to control the usage of slotted mode transmission for the downlink. The mobile station or network can determine the frequency of use of the compressed mode based on a variety of factors, such as the radio propagation conditions, the mobile station's speed and other interfering factors, the relative call density, and the proximity to cell borders where handover is more likely to be needed.

Figure 6:
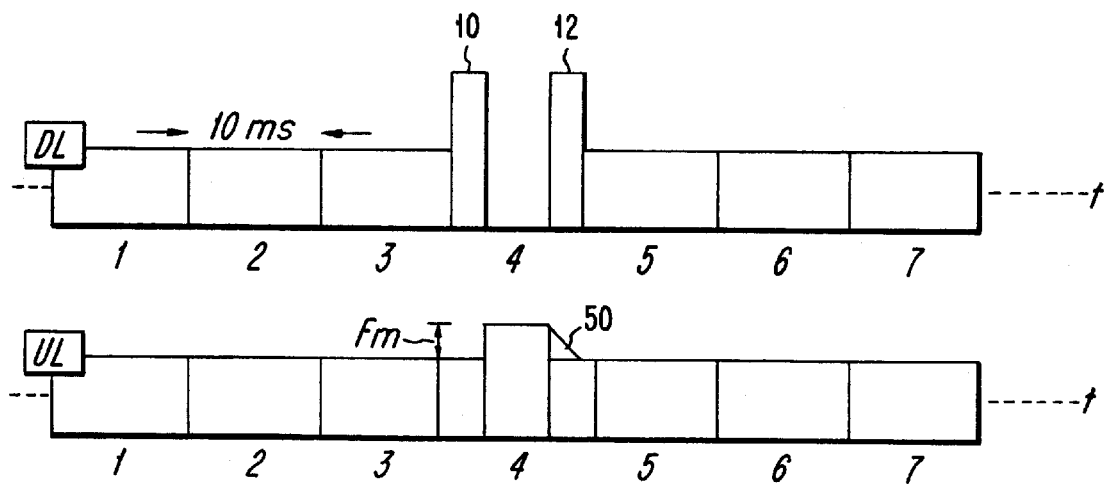
FIG. 6 illustrates downlink and uplink transmissions showing power control techniques in conjunction with slotted mode transmission according to one exemplary embodiment of the present invention.

FIG. 6 depicts power control according to one exemplary embodiment of the present invention, wherein when the base station enters slotted mode, the mobile station increases its transmit power by a fading margin (FM). The mobile station can become aware of the base station's slotted mode transmission either through receipt of a earlier, explicit signal from the base station or by detecting the change in rate/power of received transmissions on the downlink. The value of FM can be estimated by the mobile station, e.g., based upon recent changes in power as determined by recently received power control bits. Alternatively, FM can be estimated by the base station and transmitted to the mobile. By increasing transmit power in the uplink only during the corresponding idle time during slotted mode transmission in the downlink, overall interference is reduced and system capacity is increased as compared with the afore-described situation wherein the slow power control loop adapts to frequent slotted mode transmissions and avoids received signal quality degradation associated with less frequent slotted mode transmissions. Once the idle time has ended, the subsequently received power control bits can then ramp the mobile station's power level to an optimal level (down in this example as seen by ramp function 50).

Figure 1:
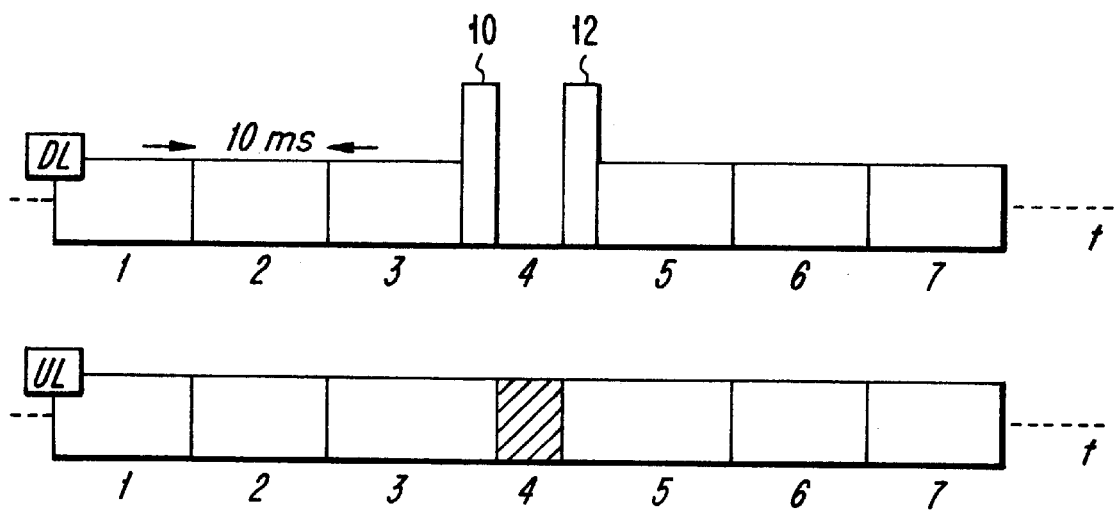
FIG. 1 is a schematic illustration of uplink and downlink transmissions wherein the downlink enters slotted mode in a particular frame.
Figure 2:
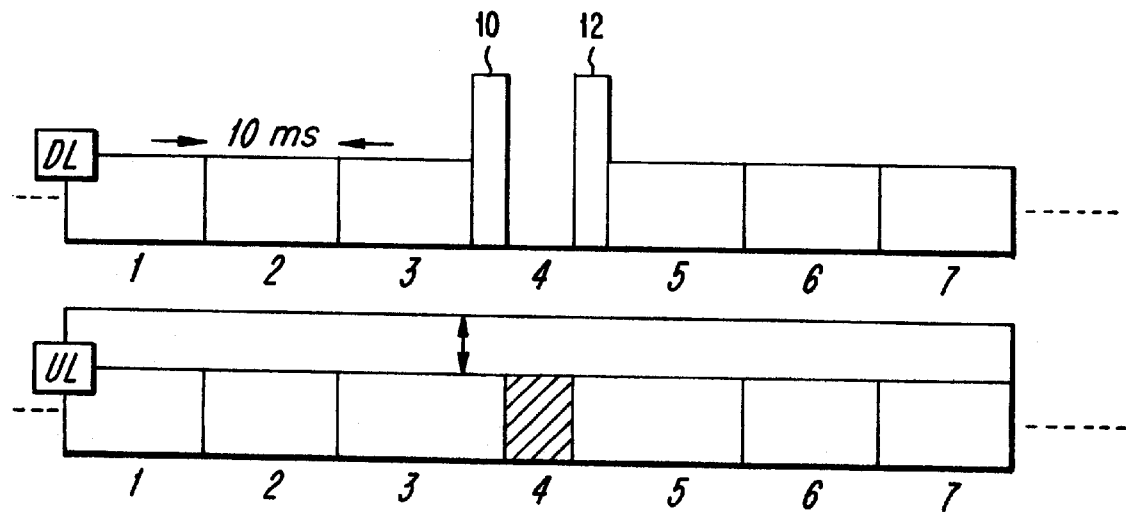
FIG. 2 is a schematic illustration of uplink and downlink transmissions wherein a fading margin is added to the transmit power level for all uplink frames.
Figure 7:
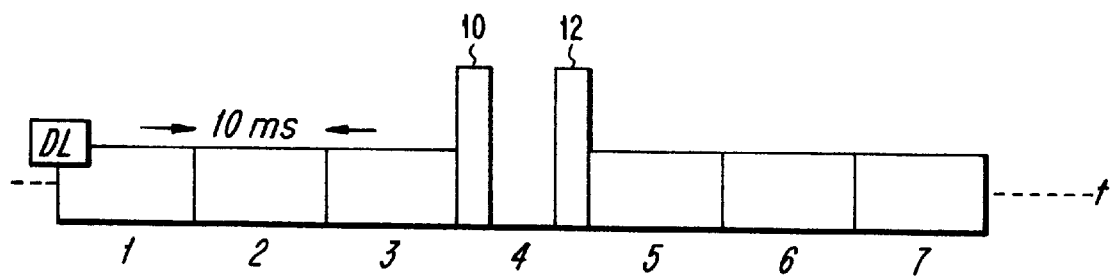
FIG. 7 illustrates downlink and uplink transmissions showing power control techniques in conjunction with slotted mode transmission according to one exemplary embodiment of the present invention.
Figure 7:
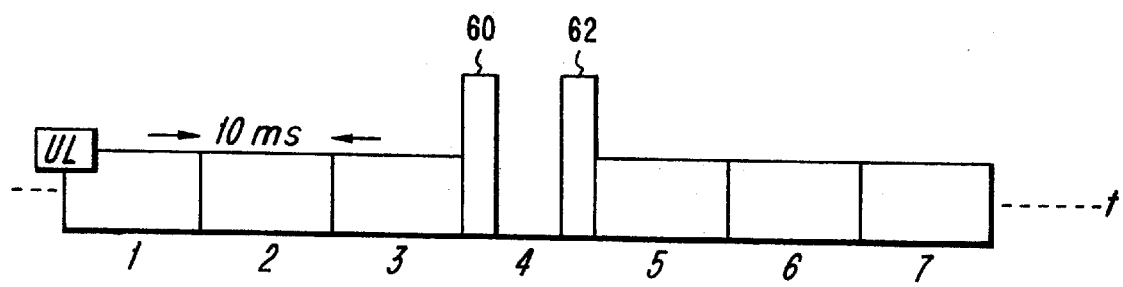

According to another exemplary embodiment of the present invention, illustrated in FIG. 7, once one link enters slotted mode, the other link can enter slotted mode as well. For example, once the downlink enters slotted mode in FIG. 7 by transmitting a double rate burst 10 in frame #4, so too can the mobile station enter slotted mode by transmitting a double rate burst 60 on the uplink. Both links will then have mirrored idle portions during which no transmission occurs, whereby uplink reception by the base station will not suffer due to lack of received power control commands at the mobile station, as occurs in FIG. 1. Moreover, this technique also avoids the problem described above with respect to FIG. 2 of globally increasing the transmit power in the uplink by using the slow power control loop to adapt to increased BER/FER created by slotted mode transmissions.

The preceding description of the preferred embodiments are provided to enable any person skilled in the art to make and use the present invention. Various modifications to these embodiments will be readily apparent to those skilled in the art, and the principles described herein may be applied without departing from the scope and spirit of the present invention. Thus, the present invention is not limited to the disclosed embodiments, but is to be accorded the widest scope consistent with the claims below.

What is claimed is:

1. A method for communicating information in a code division multiple access system comprising the steps of:

transmitting power control commands from a first station;

receiving said power control commands at a second station;

transmitting information from said second station at a power level based on said power control commands;

interrupting transmissions from said first station; and transmitting information from said second station at said power level increased by a predetermined value while said transmissions are interrupted from said first station.

2. The method of claim 1, wherein said first station is a base station and said second station is a mobile station.

3. The method of claim 1, wherein said predetermined value is a fading margin.

4. The method of claim 3, wherein said fading margin is determined at said mobile station.

5. The method of claim 3, wherein said fading margin is determined at said base station.

6. The method of claim 1, further comprising the step of:

resuming transmissions of said power level commands from said first station; and ramping said power level to a new value based on said power level commands.

7. The method of claim 1, further comprising the step of:

measuring, by said second station, channels while said transmissions are interrupted from said first station.

8. A method for communicating information in a code division multiple access system comprising the steps of:

transmitting information in frames from a first station to a second station on a first link;

transmitting information in frames from said second station to said first station on a second link;

entering, at a particular frame, a slotted mode transmission format at said first station; and entering, at said same particular frame, said slotted mode transmission format at said second station.

9. The method of claim 8, wherein both of said steps of entering said slotted mode transmission format further comprise the step of:

increasing a rate of said transmission in at least one portion of said particular frame; and providing an idle portion during another portion of said at least one particular frame.

10. The method of claim 8 wherein at least one of said steps of entering said slotted mode transmission format further comprise the step of:

adjusting a spreading factor associated with said transmission.

11. The method of claim 8 wherein at least one of said steps of entering said slotted mode transmission format further comprise the step of:

puncturing a code associated with said transmission.

12. The method of claim 8 wherein at least one of said steps of entering said slotted mode transmission format further comprise the step of:

changing a number of spreading codes associated with said transmission.

13. A system for communicating information in a code division multiple access system comprising:

means for transmitting power control commands from a first station;

means for receiving said power control commands at a second station;

means for transmitting information from said second station at a power level based on said power control commands;

means for interrupting transmissions from said first station; and means for transmitting information from said second station at said power level increased by a predetermined value while said transmissions are interrupted from said first station.

14. The system of claim 13, wherein said first station is a base station and said second station is a mobile station.

15. The system of claim 13, wherein said predetermined value is a fading margin.

16. The system of claim 15, wherein said fading margin is determined at said mobile station.

17. The system of claim 15, wherein said fading margin is determined at said base station.

18. The system of claim 13, further comprising the step of:

means for resuming transmissions of said power level commands from said first station; and means for ramping said power level to a new value based on said power level commands.

19. The system of claim 13, further comprising:

means for measuring, by said second station, channels while said transmissions are interrupted from said first station.

20. A system for communicating information in a code division multiple access system comprising:

means for transmitting information in frames from a first station to a second station on a first link;

means for transmitting information in frames from said second station to said first station on a second link;

means for entering, at a particular frame, a slotted mode transmission format at said first station; and means for entering, at said same particular frame, said slotted mode transmission format at said second station.

21. The system of claim 20, wherein both of said steps means for entering said slotted mode transmission format further comprise:

means for increasing a rate of said transmission in at least one portion of said particular frame; and means for providing an idle portion during another portion of said at least one particular frame.

22. The system of claim 20 wherein at least one of said means for entering said slotted mode transmission format further comprise:

means for adjusting a spreading factor associated with said transmission.

23. The system of claim 20 wherein at least one of said means for entering said slotted mode transmission format further comprise:

means for puncturing a code associated with said transmission.

24. The system of claim 20 wherein at least one of said means for entering said slotted mode transmission format further comprise:

means for changing a number of spreading codes associated with said transmission.

* * * * *